J. A. MERRIMAN.
MACHINE FOR CUTTING SCREWS.
No. 2,423. Reissued Dec. 18, 1866.
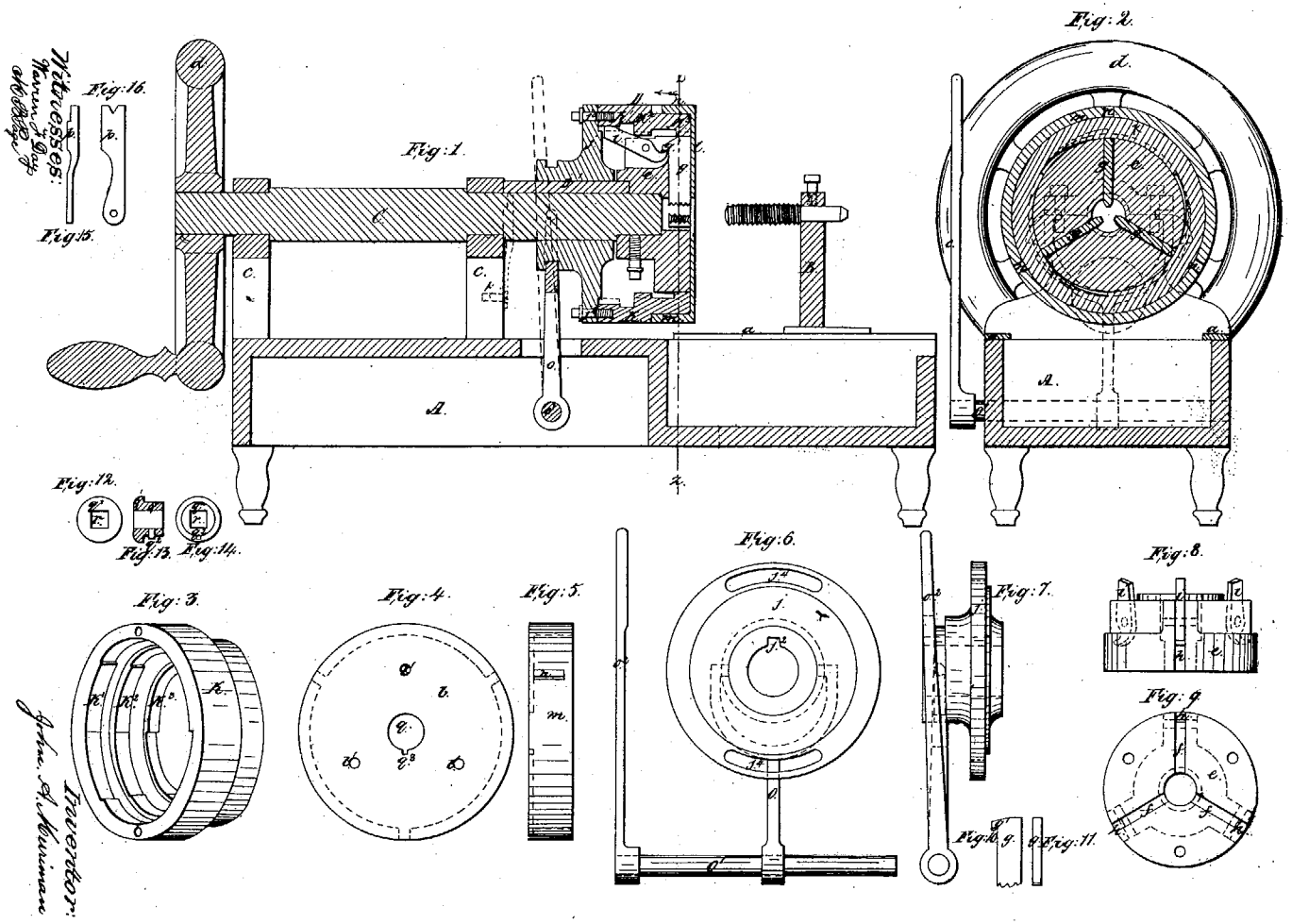
THE NORRIS PETERS CO., PHOTO-LITHO., WASHINGTON, D. C.

United States Patent Office.

IMPROVED MACHINE FOR CUTTING SCREWS.

JOHN A. MERRIMAN, OF CHICAGO, ILLINOIS

*Letters Patent No.* 49,133, *dated August* 1, 1865; *reissue No.* 2,423, *dated December* 18, 1866.

The Schedule referred to in these Letters Patent and making part of the same.

TO ALL WHOM IT MAY CONCERN:

Be it known that I, JOHN A. MERRIMAN, of Chicago, in the county of Cook, and State of Illinois, have invented a new and useful Machine for Cutting Screw-Threads on Bolts; and I do hereby declare that the following is a full, clear, and exact description of the construction and operation of the same, reference being had to the annexed drawings, making a part of this specification, in which—

Figure 1 represents a longitudinal vertical section of my invention.

Figure 2 is a transverse vertical section the plane of section being indicated by the line *z z*, fig. 1, and looking in the direction of the arrow marked near that line.

Figure 3 is a perspective view of the ring or cylinder, showing its internal ways or bearings.

Figure 4 is a front elevation of the cap or face-plate.

Figure 5 is a side elevation of the same.

Figure 6 is a front elevation of the sliding flange with its levers and rock-shaft attached.

Figure 7 is a side elevation of the same.

Figure 8 is a side elevation of the die-holder with its levers shown in perspective.

Figure 9 is a front elevation of the same.

Figure 10 is a side elevation of the die.

Figure 11 is a front elevation of the same.

Figure 12 is a front elevation of the cap-holder.

Figure 13 is a longitudinal vertical section of the same.

Figure 14 is a back elevation of the same.

Figure 15 is a side elevation of the latch.

Figure 16 is a front elevation of the same.

Similar letters of reference indicate like parts.

This invention consists in a ring or cylinder, provided with internal ways or bearings, (portions of which are made eccentric,) so constructed in conjunction with other parts that it is capable of being slid laterally backward and forward at the will of the operator; a set of levers attached to the die-holder; a set of dies, each of which is provided with an incline and a projection or hook; a sliding flange with its connecting and operating levers; and a latch or stop; all arranged in such a manner that by working the operating lever the sliding flange, with the ring or cylinder attached, is moved backward and forward, which causes the dies to open and close at the will of the operator, which allows of the bolt being withdrawn without stopping or reversing the machine. By changing the rotary position of the ring or cylinder in relation to the sliding flange and die-holder, the size of opening in the dies can be adjusted to compensate for wear of the dies, or to cut bolts of different sizes. By raising or otherwise removing the latch or stop, and thus permitting the ring or cylinder to move a trifle further backward, the dies are all relieved, and can readily be put in or taken out without removing other parts of the machine.

A represents a frame made of cast iron or other suitable material, and provided with two guide-ways, *a*, to receive the movable head-block, B. In this head-block the bolts are fastened, on which a screw-thread is to be cut. C is the spindle which carries the head, D, containing the dies; said spindle has its bearings in two standards, *c*, rising from the frame A, and is provided with a hand-wheel, pulley, or gearing, *d*, by means of which a rotary motion is imparted to it. The head, D, is composed of seven principal parts, (exclusive of the dies,) which are connected to each other and to the spindle, as will be presently explained. The inner part or die-holder, *e*, is rigidly attached to the spindle with a set-screw, or in any other suitable manner, and is provided with three (more or less) slots, *f*, to receive the dies, *g*. Those slots, *f*, meet or run into other slots, *h*, running back the entire thickness of the die-holder, *e*, and are at right angles with its face. In these slots, *h*, working on suitable fulcra, are arranged the levers, *i*, (see fig. 8.) In the rear of the die-holder, *e*, is the flange, *j*, made to slide on the spindle C, but made to rotate with it by means of the feather, $j^1$, and the slot, $j^2$. In front of the flange *j*, and firmly fastened to it by means of bolts, $j^3$, passing through slots, $j^4$, (see fig. 6,) is the ring or cylinder, K, (see fig. 3.) This ring or cylinder is provided with three internal ways or bearings, $K^1$ $K^2$ $K^3$. These ways or bearings are subdivided into six (more or less) parts, (the number of parts being twice the number of dies used.) Each alternate part is made on the same circle with the body of the ring or cylinder itself; the remaining parts are made eccentric with the ring or cylinder. The eccentric parts of the ways or bearings, $K^1$ and $K^2$, are in the same position to each other, and expand in the same direction with each other. The eccentric parts of the way or bearing $K^3$ are in the same relative position as the others, but expand in a contrary direction to them. This arrangement of the eccentrics is made to correspond to the reverse motion of the levers and dies, and the whole arrangement of eccentrics is used only to adjust the size of opening in the dies, and to compensate for wear. The dies, *g*, are retained in the slots, *f*, by means of a cap or face-plate, *l*, (see figs. 4 and 5,) which is secured to the die-holder, *e*, by screws. $l^1$. This cap or face-plate, *l*, has a flange or projection, *m*, at its periphery, which shuts over a portion of the ring or cylinder, thereby excluding the chips from the working parts of the machine. Through the flange *m* are openings, *n*, corresponding to the number and position of the slots *f* in the die-holder *e*. Through these openings, *n*, the dies are passed when it becomes necessary to remove or change them. The sliding flange, *j*, with the ring or cylinder, K, attached, is moved backward and forward by means of the forked lever, *o*, (see figs. 6 and 7,) the rock-shaft, $o^1$, and the operating lever, $o'$, as will be readily understood. This arrangement of levers may be varied to suit different styles of machines. A portion of the outer ends of the dies *g* is made square, or at right angles with their face, and a portion is made at an angle less than a right angle with their face. The latter portion forms an incline which is prolonged beyond the back side of the die, and forms a projection or hook, $g^1$. It is not essential that this incline and projection or hook should be formed of one solid piece with the cutting portion of the die; but if, for any reason, it is desirable, the dies may be constructed of several pieces, bolted or otherwise rigidly fastened together. The altitude of the incline should correspond to the amount of movement required in opening and closing the dies. I do not wish to be understood, however, as confining myself to the exact proportions of the incline, which may be varied according to circumstances. The inner ends of the dies *g* are so made as to form screw-cutting tools, which, when caused to revolve around the iron rod or bolt, cut a screw-thread thereon. The dies *g* are held firmly in position for working (see fig. 1) by their projections or hooks resting upon the ends of the levers *i*, and the square part of their outer ends bearing firmly against the way or bearing $K^3$ in the ring or cylinder K. The latch or stop, *p*, (see figs. 15 and 16,) is attached to the standard, *c*, by means of a screw, $p^1$. This latch or stop prevents the ring or cylinder K from sliding entirely off the inclines, and relieving the dies while the machine is in motion. The exact form of this latch or stop, and mode of attaching it, may be varied to suit circumstances. It is only necessary that it be so made, attached, and used, that when it is in position for work it will arrest the backward motion of the ring or cylinder, so as to prevent it from sliding entirely off the inclines, and that on being raised or removed the ring or cylinder will be permitted to slide entirely off the inclines, in order to relieve the dies and facilitate their removal. When the flange *j*, with the ring or cylinder K attached, is moved backward by means of the operating lever, $o^2$, the internal way or bearing, $K^2$, in the ring or cylinder K, comes in contact with the levers *i*, and thereby causes them to act upon the dies *g*, and draw them outward. The bearing, $K^2$, does not reach the levers *i* until the bearing $K^3$ has left the square portion of the dies *g*; it (the bearing $K^3$) then recedes along the inclines and permits the dies *g* to be drawn outward or expanded. When the bearing $K^3$ has reached a point near the end of the inclines, the ring or cylinder K is arrested in its further progress by the latch or stop, *p*, and the dies *g* are thereby retained in the slots *f*. Whenever it becomes necessary to remove the dies *g*, the latch or stop *p* is raised or removed, which permits the ring or cylinder K to slide backward entirely off the inclines, so that the bearing $K^3$ clears the projection or hook $g^1$; the dies *g* are then taken out at the openings *n*, in the flange *m*, of the cap *l*. When the flange *j*, with the ring or cylinder K attached, is moved forward by means of the operating lever, $o^2$, the way or bearing, $K^3$, in the ring or cylinder K, comes in contact with the inclines at the outer ends of the dies *g*, and forces them inward until it reaches their square part, when it ceases to act upon the dies, but continues its forward movement until it reaches the cap *l*, in which position the square part of the ends of the dies *g* bear firmly against it, (the way or bearing $K^3$,) and are capable of resisting the pressure consequent upon cutting the screw without yielding. The position of the ring or cylinder K, and consequent size of opening in the dies while the machine is cutting the screw, may be regulated by means of the circular slots, $j^4$, through which the bolts $j^3$ pass, which allows of the ring or cylinder K being moved in either direction and fastened in the desired position. The outer or long ends of the levers *i* are slightly curved, so as to give the inner or short ends a uniform motion. This becomes necessary, owing to the continually increasing distance from the fulcra to the point where the bearing $K^2$ acts upon the levers. After the bearing $K^2$ leaves the levers *i*, in its forward movement, the outer ends of the levers *i* rest against the bearing $K^1$; this holds the dies in their proper position against the bearing $K^3$, and prevents any lost motion. The tap-holder, $q^*$, (see figs. 12, 13, and 14,) is made to fit the central hole, *q*, in the face-plate *l*, and is provided with a flange, $q^1$, which bears against the face-plate *l*; it is also provided with a stud, $q^2$, which passes through the face-plate *l*, in the notch $q^3$, and enters one of the die-slots, *f*, in the die-holder *e*, (the dies being removed.) The notch, $q^3$, being narrower than the slot *f*, the stud $q^2$ locks by the face-plate *l*; by this means the tap-holder is held firmly in its place. The tap-holder is also provided with a square hole or socket, *r*, in its centre, in which the shank of the tap fits while in use.

The operation of this machine is as follows: The several parts being in their position, as shown in fig. 1, the motive power is applied to the spindle C, causing it, with the head D, and dies *g*, to revolve around a common centre. The bolt upon which a screw-thread is to be cut is fastened in the movable head-block B, which is moved up to the dies, causing them to cut the required screw upon the bolt. When the screw has been cut the desired length upon the bolt, the operator, by means of the operating lever, $o^2$, causes the flange *j*, with the ring or cylinder K attached, to slide backward upon the spindle C; the bearing $K^2$ acts upon the levers *i*, and the levers acting upon the dies *g*, cause them to be drawn outward or opened, which allows of the bolt being withdrawn without stopping or reversing the machine. By moving the flange *j*, with the ring or cylinder K attached, forward by means of the operating lever $o^2$, the way or bearing $K^3$ is made to act upon the inclines of the dies *g*, and causes them to be pushed inward or closed; the machine is then ready to receive another bolt.

Having thus minutely described the construction and operation of my invention, I do not wish to be understood as confining myself to this particular construction of all the parts, but believing the screw-cutting dies provided with inclines and projections or hooks, the sliding ring or cylinder provided with internal ways or bearings, the small levers, and the latch or stop, when used for the purposes herein set forth, to be new—

1. I claim, in combination with a revolving die-holder, two or more screw-cutting dies provided with inclines and projections, arranged and operating substantially in the manner and for the purposes herein specified.

2. In combination with a revolving die-holder and two or more screw-cutting dies, constructed substantially as described, I claim the arrangement of longitudinally sliding bearings operating upon said dies, substantially in the manner and for the purposes set forth.

3. In combination with longitudinally sliding bearings operating directly upon screw-cutting dies, substantially as described, I claim the arrangement of a latch or stop for the purpose of retaining said dies in, or releasing them from, the die-holder at the will of the operator, substantially as herein specified.

4. Closing the dies by the use of the bearings K upon the longitudinally sliding cylinder acting directly upon the dies, substantially as and for the purposes herein specified.

5. The sliding bearings K, the levers *i*, and the dies *g*, arranged and operating substantially as and for the purposes herein specified.

JOHN A. MERRIMAN.

Witnesses:

W. E. MARRS,

A. D. STURTEVANT.